US008552098B2

(12) United States Patent  (10) Patent No.: US 8,552,098 B2
Chaudhary et al.  (45) Date of Patent: Oct. 8, 2013

(54) PURIFIED ACETYLATED DERIVATIVES OF CASTOR OIL AND COMPOSITIONS INCLUDING SAME

(75) Inventors: Bharat I. Chaudhary, Princeton, NJ (US); Beate Sczekalla, Halle (DE); Abhijit Ghosh-Dastidar, East Brunswick, NJ (US); Yang Cheng, Midland, MI (US); Prashant Tatake, Mumbai (IN); Raymond M. Collins, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 22 days.

(21) Appl. No.: 12/821,556

(22) Filed: Jun. 23, 2010

(65) Prior Publication Data

US 2011/0076502 A1  Mar. 31, 2011

Related U.S. Application Data

(60) Provisional application No. 61/247,383, filed on Sep. 30, 2009.

(51) Int. Cl.
*C08K 5/10* (2006.01)

(52) U.S. Cl.
USPC ........................................ 524/318; 524/309

(58) Field of Classification Search
USPC ...................................................... 524/318
See application file for complete search history.

(56) References Cited

U.S. PATENT DOCUMENTS

| | | | |
|---|---|---|---|
| 2,397,592 A | 4/1946 | Blades | |
| 2,403,215 A | 7/1946 | Foster | |
| 2,458,484 A | 1/1949 | Terry et al. | |
| 2,500,918 A | 3/1950 | Reuter et al. | |
| 2,618,622 A | 11/1952 | Grummitt et al. | |
| 2,666,752 A | 1/1954 | Grummitt et el. | |
| 3,138,566 A | 6/1964 | Arnold | |
| 3,409,580 A | 11/1968 | Alzner et al. | |
| 3,639,318 A | 2/1972 | Tijunelis et al. | |
| 3,668,091 A | 6/1972 | French et al. | |
| 3,712,875 A | 1/1973 | Tijunelis | |
| 3,778,465 A | 12/1973 | Barnstorf | |
| 3,780,140 A | 12/1973 | Hammer | |
| 3,868,341 A | 2/1975 | Sauer et al. | |
| 3,872,187 A | 3/1975 | Fath | |
| 3,891,694 A | 6/1975 | Mills et al. | |
| 4,083,816 A | 4/1978 | Frankel et al. | |
| 4,346,145 A | 8/1982 | Choi et al. | |
| 4,421,886 A | 12/1983 | Worschech et al. | |
| 4,426,477 A | 1/1984 | Yasumatsu et al. | |
| 4,556,694 A | 12/1985 | Wallace | |
| 4,605,694 A | 8/1986 | Walker | |
| 4,612,192 A | 9/1986 | Scheuffgen et al. | |
| 4,613,533 A | 9/1986 | Loomis et al. | |
| 4,627,993 A | 12/1986 | Loomis | |
| 4,670,494 A | 6/1987 | Semenza, Jr. | |
| 4,857,600 A | 8/1989 | Gross et al. | |
| 5,225,108 A | 7/1993 | Bae et al. | |
| 5,227,417 A | 7/1993 | Krousl | |
| 5,246,783 A | 9/1993 | Spenadel et al. | |
| 5,270,366 A | 12/1993 | Hein | |
| 5,278,236 A | 1/1994 | Case et al. | |
| 5,430,108 A | 7/1995 | Schlosberg et al. | |
| 5,454,806 A | 10/1995 | Shinonome | |
| 5,464,903 A | 11/1995 | Hofman | |
| 5,466,267 A | 11/1995 | Baillargeon et al. | |
| 5,495,033 A | 2/1996 | Basu et al. | |
| 5,575,965 A | 11/1996 | Caronia et al. | |
| 5,736,605 A | 4/1998 | Oshima | |
| 5,756,570 A | 5/1998 | Hoch et al. | |
| 5,886,072 A | 3/1999 | Linsky et al. | |
| 6,063,846 A | 5/2000 | Weng et al. | |
| 6,114,425 A | 9/2000 | Day et al. | |
| 6,274,750 B1 | 8/2001 | Sato et al. | |
| 6,417,260 B1 | 7/2002 | Weng et al. | |
| 6,437,170 B1 | 8/2002 | Thil et al. | |
| 6,451,958 B1 | 9/2002 | Fan et al. | |
| 6,496,629 B2 | 12/2002 | Ma et al. | |
| 6,608,142 B1 | 8/2003 | Weng et al. | |
| 6,706,815 B2 | 3/2004 | Marchand et al. | |
| 6,714,707 B2 | 3/2004 | Rossi et al. | |
| 6,734,241 B1 | 5/2004 | Nielsen et al. | |
| 6,797,753 B2 | 9/2004 | Benecke et al. | |
| 6,849,694 B2 | 2/2005 | Hata | |
| 6,949,597 B2 | 9/2005 | Nielsen et al. | |
| 7,700,675 B2 | 4/2010 | Bueno de Almeida et al. | |

(Continued)

FOREIGN PATENT DOCUMENTS

| | | |
|---|---|---|
| CA | 1188445 | 6/1985 |
| CN | 1341681 | 3/2002 |

(Continued)

OTHER PUBLICATIONS

Vertellus Performance Materials Inc.; Flexricin P-8 Technical Data Sheet, Nov. 2006.*
Grummitt et al., Industrial and Engineering Chemistry, vol. 37, No. 5, May 1945, pp. 485-491.*
International Search Report and Written Opinion of PCT/US2010/050690 dated Feb. 8, 2011.
Danisco, Grindsted Soft-n-Safe brochure (date unknown).
Orellana-Coca et al., Journal of Molecular Catalysis B: Enzymatic 44 (2007) 133-137.
Du et al., JAOCS, vol. 81, No. 4 (2004) 477-480.
Sheehan et al, A Look Back at the U.S. Department of Energy's Aquatic Species Program: Biodiesel from Algae, National Renewable Energy Laboratory, Colorado, Jul. 1998, pp. 1-294.
Greenspan et al., Industrial and Engineering Chemistry, 445(12), 1953, pp. 2722-2726.

(Continued)

*Primary Examiner* — Hui Chin
(74) *Attorney, Agent, or Firm* — Whyte Hirschboeck Dudek S.C.

(57) ABSTRACT

The present disclosure is directed to a single phase acetylated castor component (SP-ACC). An acetylated castor component is purified to produce the SP-ACC which contains a reduced amount of, or no, insoluble component(s) therein. The SP-ACC enhances the performance and properties of plasticizers of which it is a component.

15 Claims, No Drawings

(56) References Cited

U.S. PATENT DOCUMENTS

| | | |
|---|---|---|
| 2002/0013396 A1 | 1/2002 | Benecke et al. |
| 2004/0122159 A1 | 6/2004 | Mhetar et al. |
| 2005/0090590 A1* | 4/2005 | Nielsen et al. ............. 524/287 |
| 2005/0203230 A1 | 9/2005 | Kadakia et al. |
| 2006/0025544 A1 | 2/2006 | Koube et al. |
| 2006/0276575 A1 | 12/2006 | Hamaguchi et al. |
| 2007/0100049 A1 | 5/2007 | Ishizuka |
| 2007/0135562 A1 | 6/2007 | Freese et al. |
| 2008/0200595 A1 | 8/2008 | Hinault et al. |
| 2008/0227993 A1 | 9/2008 | Zuckerman |
| 2009/0149585 A1 | 6/2009 | DeQuadros Jr. et al. |
| 2009/0149586 A1 | 6/2009 | DeQuadros Jr. et al. |
| 2009/0312478 A1 | 12/2009 | Hasegawa et al. |
| 2010/0010127 A1 | 1/2010 | Barki et al. |
| 2010/0256278 A1 | 10/2010 | Harada et al. |
| 2011/0076502 A1 | 3/2011 | Chaudhary et al. |
| 2011/0272174 A1 | 11/2011 | Chaudhary et al. |
| 2013/0005937 A1 | 1/2013 | Cramail et al. |

FOREIGN PATENT DOCUMENTS

| | | |
|---|---|---|
| CN | 101070510 | 11/2007 |
| CN | 101108982 | 1/2008 |
| CN | 101591588 | 12/2009 |
| CN | 101824193 | 9/2010 |
| CN | 101914219 | 12/2010 |
| EP | 0192961 A1 | 9/1986 |
| EP | 0358179 A2 | 3/1990 |
| EP | 0364717 A1 | 4/1990 |
| EP | 0393813 A1 | 10/1990 |
| EP | 0473915 A1 | 3/1992 |
| EP | 0565984 A1 | 10/1993 |
| EP | 1361039 | 11/2003 |
| EP | 0986606 B1 | 8/2004 |
| EP | 1218443 | 10/2005 |
| EP | 1624014 | 8/2006 |
| EP | 2070977 A2 | 6/2009 |
| EP | 2245089 A1 | 5/2012 |
| FR | 1437722 | 5/1966 |
| GB | 499931 | 1/1939 |
| GB | 790314 | 2/1958 |
| GB | 910543 * | 11/1962 |
| GB | 934689 | 8/1963 |
| GB | 1022920 | 3/1966 |
| GB | 1102506 | 2/1968 |
| GB | 1300526 | 12/1972 |
| GB | 1341623 | 12/1973 |
| GB | 1415770 | 11/1975 |
| GB | 2155021 | 9/1985 |
| JP | S61/016950 | 1/1986 |
| JP | 04-059851 | 2/1992 |
| JP | H04-085354 | 3/1992 |
| JP | H04-261452 | 9/1992 |
| JP | 2000-319468 | 11/2000 |
| JP | 2003-064233 | 3/2003 |
| JP | 2003-297149 | 10/2003 |
| JP | 2004311064 | 11/2004 |
| JP | 2010-042669 | 2/2010 |
| WO | 9730115 | 8/1997 |
| WO | 0114466 | 3/2001 |
| WO | 01/98404 | 12/2001 |
| WO | 2004/052977 A1 | 6/2004 |
| WO | 2007006489 | 1/2007 |
| WO | 2008081330 | 7/2008 |
| WO | 2008081332 | 7/2008 |
| WO | 2008/122364 A1 | 10/2008 |
| WO | 2009/102877 | 8/2009 |
| WO | 2011/041372 | 4/2011 |
| WO | 2011/041388 | 4/2011 |
| WO | 2011041380 | 4/2011 |
| WO | 2013003225 A2 | 1/2013 |

OTHER PUBLICATIONS

Thomson Scientific, Mar. 13, 2009, London, GB.
Gan et al., European Polymer Journal, 31(8), 1994, pp. 719-724.
Rehberg et al., Ind. Eng. Chem., 44(9) 1952, pp. 2191-2195.
Tekin et al., JAOCS, 77(3), 2000, pp. 281-283.
Cai et al., Eur. J. Lipid Sci., Technol., 2008, 110, pp. 341-346.
Campanella et al., Chemical Engineering Journal, 144 (2008), pp. 466-475.
Santacesara et al, Chemical Engineering Journal, vol. 173, Issue 1, Sep. 1, 2011, pp. 198-209.
Senzana et al, Journal of the Americal Oil Chemists Society, vol. 78, No. 7 (2001), pp. 725-731.
Haas, Fuel Processing Technology 86, 2005, pp. 1087-1096.
Freedman et al., JAOCS, 63(10), 1986, pp. 1375-1380.
Morgenstern, B., Epoxidized Fatty Acid Esters as Plasticizers for PVC, presented at the 7th Freiberg Polymer Conference, Apr. 21 and 22, 2005.
Morgenstern, B., Use of Modified Fatty Acid Esters as Plasticizers for PVC dated Sep. 12, 2003.
Morgenstern, B., Epoxidized Fatty Acid Esters as Plasticizers for PVC dated Apr. 22, 2005.
Opposition filed against EP2245089 dated Jan. 9, 2013.
http://hebjingu.en.alibaba.com.
http://en.wikipedia.org/wiki/Chlorine.
http://en.wikipedia.org/wiki/Bleaching_of_wood_pulp.
TIC America, Online catalog: Tributrin; http://web.archive.org/web/200805111543071http://www.tciamerica.com/.
International Search Report and Written Opinion of PCT/US2009/033935 dated May 18, 2009.
International Preliminary Report on Patentability of PCT/US2009/033935 dated Aug. 26, 2010.
International Search Report and Written Opinion of PCT/US2010/050654 dated Nov. 9, 2010.
International Search Report and Written Opinion of PCT/US2010/050676 dated Jan. 12, 2011.
International Preliminary Report on Patentability of PCT/US2011/041557 dated Aug. 31, 2012.
International Search Report and Written Opinion of PCT/US2011/041557 dated Sep. 5, 2011.
International Preliminary Report on Patentability of PCT/US2011/050690 dated Jan. 12, 2012.
International Search Report and Written Opinion of PCT/US2011/045653 dated Oct. 7, 2011.
International Search Report and Written Opinion of PCT/US2012/043740 dated Jan. 23, 2013.
International Search Report and Written Opinion of PCT/US2012/055070 dated Dec. 3, 2012.
International Search Report and Written Opinion of PCT/US2013/023362 dated Mar. 28, 2013.
International Search Report and Written Opinion of PCT/US2010/050699 dated Nov. 8, 2010.
International Search Report and Written Opinion of PCT/US2011/035143 dated Aug. 26, 2011.
Greenspan et al., The Journal of the American Oil Chemists Society, 33, 1956, pp. 391-394.
Taylor, Proceedings of the World Conference on Oilseed Technology and Utilization, American Oil Chemists Society, Champaign, 1992, pp. 152-165.

* cited by examiner

PURIFIED ACETYLATED DERIVATIVES OF CASTOR OIL AND COMPOSITIONS INCLUDING SAME

PRIORITY

This application claims priority to U.S. Patent Application No. 61/247,383 filed on Sep. 30, 2009, the entire content of which is incorporated by reference herein.

BACKGROUND

Plasticizers are compounds or mixtures of compounds that are added to polymer resins to impart softness and flexibility. Phthalic acid diesters (also known as "phthalates") are known plasticizers in many flexible polymer products, such as polymer products formed from polyvinyl chloride (PVC) and other vinyl polymers. Examples of common phthalate plasticizers include di-isononyl phthalate (DINP), diallyl phthalate (DAP), di-2-ethylhexyl-phthalate (DEHP), dioctyl phthalate (DOP) and diisodecyl phthalate (DIDP). Other common plasticizers, used for high temperature applications, are trimellitates and adipic polyesters. Mixtures of plasticizers are often used to obtain optimum properties.

Phthalate plasticizers have recently come under intense scrutiny by public interest groups that are concerned about the negative environmental impact of phthalates and potential adverse health effects in humans (especially children) exposed to phthalates.

Consequently, a need exists for phthalate-free plasticizers for polymer resins. A need further exists for phthalate-free plasticized polymers that have the same, or substantially the same, chemical, mechanical, and/or physical properties as polymers containing phthalate plasticizers.

SUMMARY

The present disclosure is directed to an acetylated castor component with reduced, or no, insoluble component(s) therein. The acetylated castor component is purified to remove insoluble components to produce a single phase acetylated castor component. The single phase acetylated castor component enhances the performance and properties of plasticizers of which it is part.

The present disclosure provides a component. In an embodiment, a single phase acetylated castor component is provided and contains less than about 0.2 wt % insoluble components after exposure to 15° C. for at least one week.

The present disclosure provides a composition. In an embodiment, a composition is provided and includes a single phase acetylated castor component and an epoxidized fatty acid ester. The composition contains less than 0.2 wt % insoluble components after exposure to 15° C. for at least one week.

The present disclosure provides a polymeric composition. In an embodiment, a polymeric composition is provided and includes a polymeric resin and a plasticizer composition. The plasticizer composition includes a single phase acetylated castor component and optionally an epoxidized fatty acid ester. The polymeric composition has a loop spew value from 0-2 as measured in accordance with ASTM D 3291.

The disclosure provides a conductor. In an embodiment, a coated conductor is provided and includes a metal conductor and a coating on the metal conductor. The coating includes a polymeric resin and a plasticizer composition. The plasticizer includes a single phase acetylated castor component and optionally an epoxidized fatty acid ester.

An advantage of the present disclosure is a bio-based plasticizer with reduced, or no, loop spew.

An advantage of the present disclosure is a phthalate-free and/or lead-free bio-based based plasticizer.

An advantage of the present disclosure is a bio-based plasticizer that reduces greenhouse gases.

An advantage of the present disclosure is a bio-based plasticizer which enables users to obtain LEED credits.

An advantage of the present disclosure is a bio-based plasticizer which enables users to obtain carbon credits.

An advantage of the present disclosure is a coating for wire and cable applications that is phthalate-free and lead-free.

An advantage of the present disclosure is a phthalate-free bio-based plasticizer that produces little, or no, loop spew when applied as a wire/cable coating.

DETAILED DESCRIPTION

The present disclosure is directed to single phase acetylated castor components and compositions including the same. The compositions provided herein are suitable for use as plasticizers in polymer resins and in wire and cable jacketing and insulation in particular.

All references to the Periodic Table of the Elements refer to the Periodic Table of the Elements published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent U.S. version is so incorporated by reference) especially with respect to the disclosure of synthetic techniques, product and processing designs, polymers, catalysts, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, melt index, etc., is from 100 to 1,000, then the intent is that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amounts for components in the composition and/or coating, additives, and various other components in the composition, and the various characteristics and properties by which these components are defined.

As used with respect to a chemical compound, unless specifically indicated otherwise, the singular includes all isomeric forms and vice versa (for example, "hexane", includes all isomers of hexane individually or collectively). The terms "compound" and "complex" are used interchangeably to refer to organic-, inorganic- and organometallic compounds. The term, "atom" refers to the smallest constituent of an element regardless of ionic state, that is, whether or not the same bears a charge or partial charge or is bonded to another atom. The term "amorphous" refers to a polymer lacking a crystalline melting point as determined by differential scanning calorimetry (DSC) or equivalent technique.

The terms "comprising", "including", "having" and their derivatives are not intended to exclude the presence of any additional component, step or procedure, whether or not the same is specifically disclosed. In order to avoid any doubt, all compositions claimed through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

"Composition" and like terms mean a mixture or blend of two or more components.

"Blend," "polymer blend" and like terms mean a blend of two or more polymers, as well as blends of polymers with various additives. Such a blend may or may not be miscible. Such a blend may or may not be phase separated. Such a blend may or may not contain one or more domain configurations, as determined from transmission electron spectroscopy, light scattering, x-ray scattering, and any other method known in the art.

The term "polymer" (and like terms) is a macromolecular compound prepared by reacting (i.e., polymerizing) monomers of the same or different type. "Polymer" includes homopolymers and copolymers.

In an embodiment, the compositions disclosed herein are phthalate-free. The term "phthalate-free composition," as used herein, is a composition devoid of phthalate or is otherwise free of phthalate. A "phthalate," is a compound which includes the following structure (I):

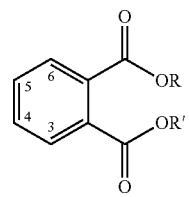

(I)

wherein R and R' may be the same or different. Each of R and R' is selected from a substituted-/unsubstituted-hydrocarbyl group having 1 to 20 carbon atoms. As used herein, the term "hydrocarbyl" and "hydrocarbon" refer to substituents containing only hydrogen and carbon atoms, including branched or unbranched, saturated or unsaturated, cyclic, polycyclic, fused, or acyclic species, and combinations thereof. Nonlimiting examples of hydrocarbyl groups include alkyl-, cycloalkyl-, alkenyl-, alkadienyl-, cycloalkenyl-, cycloalkadienyl-, aryl-, aralkyl, alkylaryl, and alkynyl-groups. Each position 3, 4, 5, and 6 may be populated by hydrogen or other moiety.

In an embodiment, the compositions disclosed herein are lead-free.

In an embodiment, an acetylated castor component is provided. A "castor component," as used herein, is a castor oil, a castor wax, or a mixture thereof. The term "castor oil" is a pale yellow-to-colorless viscous liquid obtained from the castor bean/seed of the castor plant *Ricinus communis*. Castor oil is a triglyceride in which from about 85 wt % to about 95 wt % of the fatty acid chains are ricinoleic acid. A "fatty acid," as used herein, is a monocarboxylic acid composed of an aliphatic chain containing 4 to 22 carbon atoms with a terminal carboxyl group (COOH). The fatty acid can be saturated or unsaturated, branched or unbranched, and may or may not include one or more hydroxyl group(s).

A nonlimiting compositional representation of castor oil is provided at Representation (II) below.

Compositional Representation of Castor Oil (II)

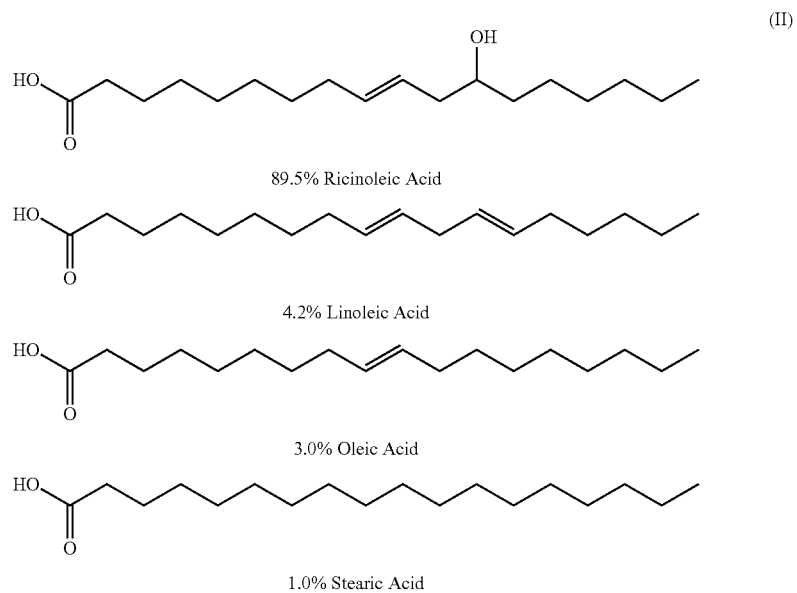

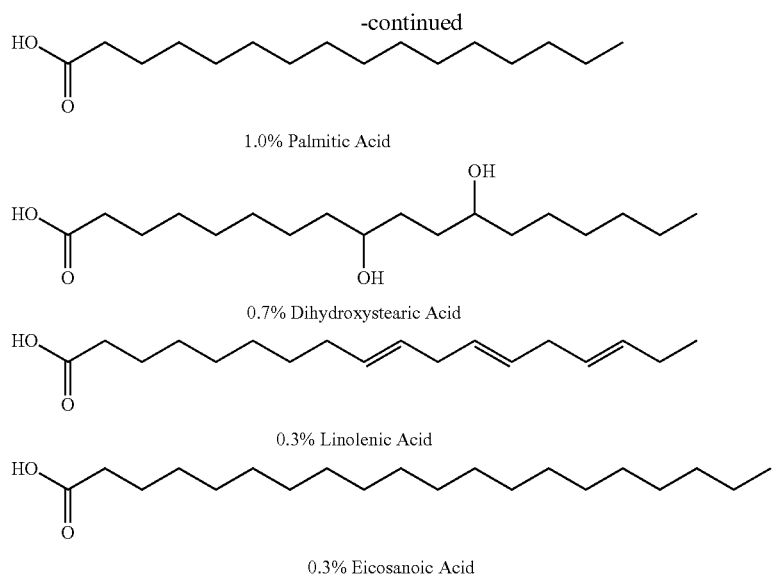

Wt % based on total weight of the castor oil

The term "castor wax" is hydrogenated castor oil, and is a hard, brittle, high melting point wax with about 40 wt % to about 95 wt % glyceryl trihydroxystearate. It is produced by the hydrogenation of castor oil, typically in the presence of a nickel catalyst. Castor wax is odorless and is insoluble in water. Castor wax may be partially or fully hydrogenated castor oil.

The castor component is acetylated. The term "acetylating" or "acetylation," as used herein, is the process of introducing an acetyl group into the molecule of a compound having —OH groups. In other words, acetylation replaces H of the —OH groups with $CH_3CO$— groups. Acetylation may also occur with a fatty acid moiety having a hydroxyl group (i.e., the —OH group at $C_{12}$ of the ricinoleic acid moiety of a glyceride). Nonlimiting examples of suitable acetylation reagents include acetic anhydride and acetyl chloride. Thus, an "acetylated castor component" (or "ACC") is a castor component that has been subjected to an acetylation reaction. In other words, an acetylated castor component is the reaction product of a castor component and an acetylation reagent. In particular, the acetylated castor component may be an acetylated castor oil ("ACO") or an acetylated castor wax ("ACW") or mixtures thereof. The ACW may be fully or partially hydrogenated.

In an embodiment, the ACC has a hydrogenation efficiency of about 95% to 99% The efficiency is defined by the conversion of the unsaturated double bonds into saturated bonds of oleic, linoleic and ricinoleic acid present in castor oil. Reduction in Iodine value is a good measure of hydrogenation efficiency. It has been found that hydrogenation of the hydroxyl groups forms a keto-stearic acid. The keto-stearic acid affects the amount of insolubles in the final product and correspondingly the clarity of the ACC. Purification (as described below) preferably decreases or removes any keto-stearic acid formed.

Some, substantially all, or all, of the —OH groups of the castor component may be acetylated. The acetylation results in an acetylated castor component having a lower hydroxyl number than the castor component. The acetylated castor component has a hydroxyl number from 0 to less than 15, or from 0 to less than 10, or from 0 to less than 5, or 0 to less than 2, or 0.

In an embodiment, the castor component is composed solely of glyceryl trihydroxystearate. Consequently, the ACC may be acetylated glyceryl trihydroxystearate. In one embodiment, the acetylated glyceryl trihydroxystearate has a hydroxyl number from 0 to less than 15, or from 0 to less than 10, or from 0 to less than 5, or from 0 to less than 2, or 0.

In another embodiment, the acetylated castor wax has a viscosity from about 100 mPa·s to less than about 2000 mPa·s at 25° C.

Nonlimiting properties for the castor component and nonlimiting embodiments of the acetylated castor component, and a single phase acetylated castor component are provided in Table 1 below.

TABLE 1

| Properties | Castor Oil | Acetylated Castor Oil (ACO) | Castor Wax | Acetylated Castor Wax (ACW) | Single Phase-Acetylated Castor Wax (SP-ACW) |
|---|---|---|---|---|---|
| Melting Point (° C.) | Liq @ RT | Liq @ RT | 60-87 | Liq @ RT | Liq @ RT |
| Density (g/cc) at 25° C. | 0.945-0.965 | 0.950-0.960 | solid | 0.950-0.960 | 0.950-0.960 |
| Acid number (mg KOH/g) | <3 | 1-8 | <3 | 1-8 | 1-8 |

TABLE 1-continued

| Properties | Castor Oil | Acetylated Castor Oil (ACO) | Castor Wax | Acetylated Castor Wax (ACW) | Single Phase-Acetylated Castor Wax (SP-ACW) |
|---|---|---|---|---|---|
| Iodine value (gI₂/100 g) | 82-90 | ≥40 | <45 | <40 | <40 |
| Hydroxyl Number (mg KOH/g) | 150-175 | 0 to less than 5 | 150-175 | 0 to less than 15 | 0 to less than 15 |
| Viscosity mPa·s (@ 25 C.) | 600-900 | 50 to less than 1000 | | 100 to less than 2000 | 100 to less than 2000 |
| Wt % Insoluble Component* | | | | ≥0.2 | <0.2 |

*Removed by Cooling to 15° C. for 1 week and filtering at 15° C. to 25° C. with 11 μm or larger filter paper Complete, or substantially complete, acetylation of the ACC yields a liquid plasticizer composition with a viscosity suitable for use with polymeric resins and vinyl chloride resins in particular. In an embodiment, Applicants have surprisingly discovered a liquid ACW with a viscosity from about 100 mPa·s to less than about 2000 mPa·s at 25° C. In another embodiment, the ACW has a hydroxyl number from 0 to less than 15. In a further embodiment, the ACW may also have an iodine number of 0 to less than 40 g I₂/100 g.

Applicants also have discovered a liquid ACO with a hydroxyl number from 0 to less than 5 which has a viscosity from about 50 mPa·s to less than 1000 mPa·s at 25° C. The ACO may also have an iodine number from about 40 g I₂/100 g to about 90 g I₂/100 g.

In an embodiment, the acetylated castor component has an acid number from about 0 mg KOH/g to about 8 mg KOH/g.

In an embodiment, the acetylated castor component has an APHA color from about 50 to less than about 3000, or from about 50 to less than about 1000, or from about 50 to less than about 500, or from about 50 to less than about 300.

In an embodiment, the ACC is a single-phase ACC. A "single phase acetylated castor component" ("SP-ACC") is any of the foregoing ACCs that is (1) exposed to a temperature from 5° C. to 50° C., or 15° C., for at least three hours to one week, (2) subsequently subjected to a purification process (as described below), (3) then is exposed to 15° C. for at least 1 week, and (4) is filtered at 15-25° C. with 11 μm or larger filter paper which collects less than 0.2 wt % of an insoluble component(s) on the filter paper. The SP-ACC is solely (or substantially solely) a liquid phase at room temperature. The term "insoluble component," as used herein, is one or more compounds that phase separate out of the ACC over time. The ACC is a liquid at room temperature and the insoluble component phase separates out of the liquid phase ACC as a solid phase. The insoluble component turns the ACC cloudy, settles to the bottom and may lead to excessive spew when the ACC is used as a plasticizer. The lower the temperature, the more insolubles are formed. Furthermore, the grade of castor oil or castor wax used for acetylation also has an effect on the amount of insolubles formed, as well as the color of the ACC.

The SP-ACC is prepared by subjecting any of the foregoing ACCs to a purification process. A "purification process," as used herein, is the application of one or more of the following procedures to the ACC: a filtration procedure, a centrifugation procedure, a sedimentation procedure, treatment with additives [such as silicon dioxide (SiO₂), aluminum oxide (Al₂O₃), activated carbon, Perlite (naturally occurring amorphous siliceous volcanic rock), diatomaceous earth] and combinations thereof. Any of these procedures may optionally be performed at a temperature from 5° C. to 50° C. and holding at this temperature for at least 3 hours. The additives may be used to aid the filtration step and may also result in desirably lighter color of the ACC. The purification process removes, wholly or partially, any insoluble components present in the ACC and can also result in desirably lighter color. Treatment of the ACC with additives, followed by filtration, can also be performed at temperatures as high as 150° C. to result in lighter color, without necessarily decreasing the amount of insolubles. With removal of the solid phase from the ACC and/or lighter color, the resultant filtrate from the purification process is the single-phase ACC(SP-ACC). The SP-ACC is clear and has low, or no, turbidity. The SP-ACC may be an SP-ACW, an SP-ACO, and combinations thereof.

In an embodiment, the amount of insoluble component (if any) present in the SP-ACC is determined by filtering the SP-ACC at 15° C., over 11 μm or larger filter paper, (the SP-ACC being exposed to 15° C. for at least one week prior to this filtration). The amount of insoluble component deposited on the filter paper is less than 0.2 wt %. Weight percent of the insoluble component is based on the total weight of the purified ACC, (i.e., the total weight of the SP-ACC before filtration over 11 μm or larger filter paper).

In an embodiment, the SP-ACC contains less than 0.2 wt %, or from 0 wt % to less than 0.2 wt % insoluble component after being exposed to 15° C. for at least one week, or at least two weeks, or at least one month, or at least six months, or at least 12 months (or any time duration therein).

In an embodiment, the SP-ACC contains from about 0 wt % to less than about 0.2 wt % insoluble component. A nonlimiting example of an SP-ACC is an SP-ACW and is provided in Table 1 above. The SP-ACC is clear and advantageously produces no, or substantially no, spew when used as a plasticizer or coplasticizer in polymer compositions.

In an embodiment, the insoluble component is composed of mixed acetylated triglycerides containing at least one saturated fatty acid. Nonlimiting examples of individual components, formed after saponification of the insoluble component to fatty acids and methylation to form the esters, are set forth in Table 2 below.

TABLE 2

Nonlimiting examples of individual components of the insoluble component(s) after saponification and methylation Component C16:0 (Hexadecanoic acid methyl ester, saturated)
C18:0 (Octadecanoic acid methyl ester, saturated, TABLE 2-continued Nonlimiting examples of individual components of the insoluble component(s) after saponification and methylation
Component branched)
C18:1 (Octadecanoic acid methyl ester, unsaturated, one double bond)
C18:0 (Octadecanoic acid methyl ester, saturated)
C19:0 (Nonadecanoic acid methyl ester, saturated)
C18:0 (Octadecanoic acid 12-oxo methyl ester, saturated)
C20:0 (Eicosanoic acid methyl ester, saturated)
C18:0 (Octadecanoic acid methyl ester, saturated and functionalized —OH)
C22:0 (Docosanoic acid methyl ester, saturated)

In an embodiment, the single phase acetylated castor component has a turbidity from 0 NTU to 50 NTU, or from 1.0 NTU to 50 NTU.

In an embodiment, the single phase acetylated castor component has color less than 500 APHA, or from 50 APHA to 500 APHA, or from 50 APHA to less than 300 APHA.

In an embodiment, the single phase acetylated castor component has a hydroxyl number from 0 to less than 5 as measured in accordance with DIN 53402.

In an embodiment, the single phase acetylated castor component has a viscosity less than 2000 mPa·s as measured in accordance with ASTM D 445 at 25° C.

In an embodiment, the single phase acetylated castor component has an iodine value of 0 to 3, or 3.

Applicants have surprisingly and unexpectedly discovered a single phase acetylated castor component (SP-ACC) with (i) a low hydroxyl number, (ii) a low viscosity, (iii) a low turbidity, (iv) low APHA color, and optionally (v) a low iodine number which yields a plasticizer with excellent compatibility when added to polymeric resins (and vinyl chloride resins in particular). The present SP-ACC is phthalate-free, lead-free and provides a plasticizer that replicates all, or substantially all, the properties afforded by phthalate-based plasticizers.

The single phase acetylated castor component may comprise two or more embodiments disclosed herein.

In an embodiment, a composition is provided and includes a blend of (i) the SP-ACC and (ii) one or more epoxidized fatty acid ester (EFA). The SP-ACC may be any SP-ACC (i.e., any SP-ACO, any SP-ACW, and combinations thereof) as disclosed above with no limit regarding hydroxyl number and/or viscosity. The term "epoxidized fatty acid ester," as used herein, is a compound with at least one fatty acid moiety which contains at least one epoxide group. An "epoxide group" is a three-membered cyclic ether (also called oxirane or an alkylene oxide) in which an oxygen atom is joined to each of two carbon atoms that are already bonded to each other. Nonlimiting examples of suitable epoxidized fatty acid esters include epoxidized soybean oil, epoxidized propylene glycol dioleate, epoxidized palm oil, epoxidized linseed oil, epoxidized fatty acid methyl esters, epoxidized derivatives of each of the foregoing, and any combination of the foregoing.

The epoxidized fatty acid ester can be prepared in a variety of ways. For example, natural oils can be used as the starting material. In this instance, the natural oils may be saponified to the fatty acids and then esterified with alcohols. Next, the low molecular weight esters are epoxidized. The unsaturated ester can be epoxidized with a per-acid.

Alternatively, a glycidyl ester of the fatty acid can be prepared via epichlorohydrin or related chemicals. In yet another alternate, it is possible to transesterify the triglyceride with alcohols and then epoxidize the unsaturated fatty ester with a per-acid.

In an embodiment, the epoxidized fatty acid ester can be any epoxidized fatty acid $C_1$-$C_{14}$ ester, including methyl, ethyl, propyl, butyl, and 2-ethylhexyl esters. In a further embodiment, the epoxidized fatty acid ester is an epoxide of a fatty acid methyl ester.

A nonlimiting example for the preparation of an epoxide of a fatty acid methyl ester begins with soy oil, wherein the soy oil is transesterified with methanol to make the methyl ester of the fatty acids in the oil. Glycerol is removed from the reaction products due to insolubility. A solution of per-acetic acid in ethyl acetate is used to epoxidize the double bonds on the fatty acids. The per-acid is kept below 35% per-acid and 35 degrees Celsius to prevent detonation. After completion, the ethyl acetate and product acetic acid are removed via vacuum stripping.

In an embodiment, the epoxidized fatty acid ester is epoxidized soybean oil.

The SP-ACC/EFA mixture may be referred to as a "composition," "a plasticizer composition," "a plasticizer," or "SP-ACC/EFA plasticizer." The plasticizer composition may include from about 1 wt % to about 99 wt % SP-ACC and from about 99 wt % to about 1 wt % EFA, or from about 30 wt % to about 99 wt % SP-ACC and from about 70 wt % to about 1 wt % EFA (based on the total weight of the plasticizer composition).

A "plasticizer composition" or "plasticizer" is a substance that lowers the modulus and tensile strength, and increases flexibility, elongation, impact strength, and tear strength of the polymeric resin (typically a thermoplastic polymer) to which it is added. A plasticizer may also lower the melting point of the polymeric resin, lower the glass transition temperature and enhance processability of the polymeric resin to which it is added.

The plasticizer composition may include one or more SP-ACCs and/or one or more EFAs. In an embodiment, the plasticizer composition may include an SP-ACC having a hydroxyl number from 0 to less than 15, or from 0 to less than 10, or from 0 to less than 5, or from 0 to less than 2, or 0, and epoxidized soybean oil. In a further embodiment, the SP-ACC of the plasticizer composition may have a hydroxyl number of 0 and the plasticizer composition also includes epoxidized soybean oil.

In an embodiment, the present plasticizer composition is a bio-based plasticizer composition. A "bio-based plasticizer composition," as used herein, is a plasticizer composition composed of a vegetable-derived material. The ACC and the EFA are each vegetable-derived materials (castor bean and soybean, respectively). A bio-based plasticizer composition is advantageous because it reduces greenhouse gas emissions, and enables the user to obtain carbon and/or LEED (Leadership in Energy and Environmental Design) credits.

In an embodiment, the plasticizer composition includes a SP-ACW with a viscosity from about 100 mPa·s to about 2000 mPa·s at 25° C. or from about 100 to about 500 mPa·s at 25° C. The SP-ACW may also have a hydroxyl number from 0 to less than 15, or 0 to less than 10, or 0 to less than 5, or 0 to less than 2, or 0. The SP-ACW is blended with any of the foregoing EFAs.

In an embodiment, the plasticizer composition may include a SP-ACO with a hydroxyl number from 0 to less than 15, or from 0 to less than 10, or from 0 to less than 5. The SP-ACO may also have a viscosity from 50 mPa·s to less than 1000 mPa·s at 25° C. or from about 100 to about 500 mPa·s at 25° C. The SP-ACO is blended with any of the foregoing EFAs.

In an embodiment, the plasticizer composition may include an SP-ACC, a first EFA, and a second EFA. The second EFA is different than the first EFA. In a further embodiment, the plasticizer composition includes an SP-ACC, ESO, and an epoxidized propylene glycol dioleate. In yet another embodiment, the plasticizer composition includes an SP-ACC, ESO, and an epoxidized fatty acid methyl ester.

In an embodiment, the plasticizer composition is a single phase—i.e., a liquid.

Thus, the EFA alone or in combination with the ACC may be subjected to any of the foregoing purification processes used to form the SP-ACC. In an embodiment, the EFA contains less than about 0.2 wt %, or from 0 wt % to less than about 0.2 wt % insoluble components (when exposed to 15° C. for one week). In another embodiment, the SP-ACC/EFA mixture contains less than 0.2 wt %, or 0 wt % to less than about 0.2 wt % insoluble components (when exposed to 15° C. for one week). In another embodiment, an ACC/EFA mixture is purified and contains less than 0.2 wt %, or 0 wt % to less than about 0.2 wt % insoluble components (when exposed to 15° C. for one week). Weight percent is based on the total weight of the plasticizer composition.

Although the composition of this disclosure is preferably phthalate-free, the plasticizer composition may also comprise other known plasticizers including, but not limited to, phthalates (such as di-isononyl phthalate, diallyl phthalate, di-2-ethylhexyl-phthalate, dioctyl phthalate, diisodecyl phthalate and diisotridecyl phthlate), trimellitates (such as trioctyl trimellitate, triisononyl trimellitate and triisodecyl trimellitate), citrates, benzoates and adipic polyesters.

The present plasticizer composition may comprise two or more embodiments disclosed herein.

The present composition composed of SP-ACC alone or in combination with any EFA may be used in a variety of compositions or products. Nonlimiting examples of suitable applications for the composition include cosmetic compositions/products, food compositions/products, and polymeric compositions/products, soft thermoplastic polyolefins, profiles (gaskets), films, etc.

The present disclosure provides a polymeric composition. In an embodiment, a polymeric composition is provided which includes a polymeric resin and the present plasticizer composition. The plasticizer composition may be any SP-ACC, any SP-ACC plasticizer, alone or in combination with any EFA as disclosed herein. Plasticizer compatibility in the polymeric composition is assessed by visual inspection of molded or extruded specimens aged at elevated temperatures (e.g., 113° C. or 136° C.) for defined lengths of time (e.g., 7 days), or by a loop spew test on molded specimens aged at a fixed temperature (e.g., 23° C.). Loop spew is measured in accordance with ASTM D 3291: Standard Test Method for Compatibility of Plasticizers in Poly(vinyl chloride) Plastics Under Compression. The polymeric composition has a loop spew from 0-2, or 0-1, or 0 as measured in accordance with ASTM D 3291. The polymeric composition contains from about 1 wt % to about 99 wt % of the polymeric resin and from about 99 wt % to about 1 wt % of the plasticizer composition. The plasticizer composition may include from about 1 wt % to 99 wt % SP-ACC and from about 99 wt % to about 1 wt % EFA, or from 30 wt % to about 99 wt % SP-ACC and from about 70 wt % to about 1 wt % EFA. Weight percent is based on total weight of the polymeric composition.

In an embodiment, the polymeric composition contains less than 0.2 wt % insoluble components or 0 wt % to less than 0.2 wt % insoluble components. Weight percent is based on the total weight of the polymeric composition.

Nonlimiting examples of suitable polymeric resins include polysulfides, polyurethanes, acrylics, epichlorohydrins, nitrile rubber, chlorosulfonated polyethylene, chlorinated polyethylene, polychloroprene, styrene butadiene rubber, natural rubber, synthetic rubber, EPDM rubber, propylene-based polymers, ethylene-based polymers, and vinyl chloride resins. The term, "propylene-based polymer," as used herein, is a polymer that comprises a majority weight percent polymerized propylene monomer (based on the total amount of polymerizable monomers), and optionally may comprise at least one polymerized comonomer. The term, "ethylene-based polymer," as used herein, is a polymer that comprises a majority weight percent polymerized ethylene monomer (based on the total weight of polymerizable monomers), and optionally may comprise at least one polymerized comonomer.

The term "vinyl chloride resin," as used herein, is a vinyl chloride polymer, such as polyvinyl chloride (PVC), or a vinyl chloride copolymer such as vinyl chloride/vinyl acetate copolymer, vinyl chloride/vinylidene chloride copolymer, vinyl chloride/ethylene copolymer or a copolymer prepared by grafting vinyl chloride onto ethylene/vinyl acetate copolymer. The resin composition can also include a polymer blend of the above-mentioned vinyl chloride polymer or vinyl chloride copolymer with other miscible or compatible polymers including, but not limited to, chlorinated polyethylene, thermoplastic polyurethane, olefin polymers such as a methacryl polymer or acrylonitrile-butadiene-styrene polymer (ABS resin).

In an embodiment, the vinyl chloride resin is polyvinyl chloride (PVC).

In an embodiment, the polymeric composition is a thermoplastic composition. A "thermoplastic composition," as used herein, is a polymeric composition (1) that has the ability to be stretched beyond its original length and retract to substantially its original length when released and (2) softens when exposed to heat and returns to substantially its original condition when cooled to room temperature.

In an embodiment, the polymeric composition includes the polymeric resin and a plasticizer including one or more SP-ACC, optionally one or more EFA, and optionally a second EFA.

In an embodiment, the polymeric composition includes PVC, a SP-ACC and optionally an EFA. The polymeric composition has a Shore hardness from about D10 to about D70, or from about D20 to about D60.

In an embodiment, the plasticizer composition has a solution temperature from about 140° C. to about 200° C. as measured in accordance with DIN 53408. Applicants have surprisingly discovered that the plasticizer composition composed of SP-ACC and an EFA unexpectedly provides a plasticizer with low viscosity and low volatility, which is particularly suitable for high temperature wire and cable applications, and which does not migrate out of a thermoplastic polymer in which it is incorporated. In addition, the solution temperature (of 140° C.-200° C.) for the present plasticizer composition is similar to the solution temperature of conventional high molecular weight plasticizers (typically between about 140° C. and about 180° C.). Moreover, the viscosity of the present plasticizer composition is less than the viscosity of conventional high molecular weight plasticizers, such as adipic polyester plasticizers. For example, adipic polyester plasticizers, known commercially as Ultramoll® IV and Ultramoll® III adipic polyesters (products of Lanxess) have very high viscosity (approximately 6000 to 6500 mPa·s at 25° C.). It is known that the lower the viscosity of a plasticizer, the faster is its uptake into PVC powder. Hence, the present plasticizer compositions are absorbed into PVC at a faster rate than adipic polyester plasticizers, and even trimellitates of lower or similar viscosity. The present plasticizer composition exhibits an unexpected synergy between low viscosity and high molecular weight and yields a phthalate-free, safe, plasticized PVC with physical, chemical, and mechanical properties that meet and/or exceed the properties of PVC resins plasticized with conventional adipic polyester plasticizers or conventional phthalate-based plasticizers or conventional trimellitate-based plasticizers. Especially noteworthy is the retention of tensile properties exhibited by the present composition after oven aging for 168 hours at temperatures as high as 136° C.

The present polymeric composition exhibits the same, or better, flexibility and/or elongation when compared to polymer resins containing conventional adipic polyester, phthalate, and/or trimellitate plasticizers. In an embodiment, the present polymeric composition is a blend of PVC and a SP-ACC/EFA plasticizer and has a Shore hardness from about D10 to about D70, or from about D20 to about D60. Shore hardness is measured in accordance with ASTM D 2240.

In an embodiment, the polymeric composition is composed of a blend of PVC and the SP-ACC/EFA plasticizer. The polymeric composition is molded into a plaque. The plaque has a tensile strength retention greater than about 70%, or greater than about 75%, after 168 hours heat aging at 113° C. as measured on dogbones cut from 30 mil thick plaques in accordance with UL 1581 and ASTM D 638.

In an embodiment, the polymeric composition is composed of a blend of PVC and the SP-ACC/EFA plasticizer. The polymeric composition is molded into a plaque. The plaque has a tensile strength retention greater than about 70% after 168 hours heat aging at 136° C. as measured on dogbones cut from 30 mil thick plaques in accordance with UL 1581 and ASTM D 638.

In an embodiment, the present polymeric composition is composed of a blend of PVC and the SP-ACC/EFA plasticizer composition. The polymeric composition is molded into a plaque. The plaque has a tensile elongation retention greater than about 40% after 168 hours heat aging at 113° C. as measured on 30 mil thick plaques in accordance with UL 1581 and ASTM D 638.

In an embodiment, the present polymeric composition is composed of a blend of PVC and the SP-ACC/EFA plasticizer composition. The polymeric composition is molded into a plaque. The plaque has a tensile elongation retention greater than about 40% after 168 hours heat aging at 136° C. as measured on 30 mil thick plaques in accordance with UL 1581 and ASTM D 638.

The tensile strength and tensile elongation is measured for (i) unaged and (ii) heat aged dogbone specimens cut from compression molded plaques in accordance with ASTM D-638.

Any of the foregoing polymeric compositions may include one or more of the following additives: a filler, an antioxidant, a flame retardant (antimony trioxide, molybdic oxide and alumina hydrate), a heat stabilizer, an anti-drip agent, a colorant, a lubricant, a low molecular weight polyethylene, a hindered amine light stabilizer (having at least one secondary or tertiary amine group) ("HALS"), UV light absorbers (such as o-hydroxyphenyltriazines), curing agents, boosters and retardants, processing aids, coupling agents, antistatic agents, nucleating agents, slip agents, viscosity control agents, tackifiers, anti-blocking agents, surfactants, extender oils, acid scavengers, metal deactivators, and any combination thereof.

In an embodiment, the present polymeric composition includes a filler. Nonlimiting examples of suitable fillers include calcium carbonate, calcined clay, whiting, fuller's earth, magnesium silicate, barium sulfate, calcium sulfate, strontium sulfate, titanium dioxide, magnesium oxide, magnesium hydroxide, calcium hydroxide, hydrophilic fumed silica, hydrophobic (surface treated) fumed silica, and any combination of the foregoing. Nonlimiting examples of calcined clay are Satintone® SP-33 and Polyfil® 70.

In an embodiment, the present polymeric composition includes an antioxidant. Nonlimiting examples of suitable antioxidants include hindered phenols such as tetrakis[methylene(3,5-di-tert-butyl-4-hydroxyhydro-cinnamate)]methane; bis[(beta-(3,5-ditert-butyl-4-hydroxybenzyl)-methylcarboxyethyl)]sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis (3,5-di-tert-butyl-4-hydroxy)hydrocinnamate; phosphites and phosphonites such as tris(2,4-di-tert-butylphenyl)phosphite and di-tert-butylphenyl-phosphonite; thio compounds such as dilaurylthiodipropionate, dimyristylthiodipropionate, and distearylthiodipropionate; various siloxanes; polymerized 2,2,4-trimethyl-1,2-dihydroquinoline, n,n'-bis(1,4-dimethylpentyl-p-phenylenediamine), alkylated diphenylamines, 4,4'-bis(alpha, alpha-dimethylbenzyl) diphenylamine, diphenyl-p-phenylenediamine, mixed di-aryl-p-phenylenediamines, and other hindered amine anti-degradants or stabilizers. Nonlimiting examples of suitable antioxidants include Topanol® CA, Vanox® 1320, Irganox® 1010, and Jrganox® 1076. The antioxidant or antioxidants may be added to the plasticizer composition of this disclosure. Antioxidants can be used in amounts of 0.01 to 5 wt % based on the weight of the composition.

In an embodiment, the present polymeric composition includes a heat stabilizer. Nonlimiting examples of suitable heat stabilizers include lead-free mixed metal heat stabilizers, lead stabilizers, organic heat stabilizers, epoxides, salts of monocarboxylic acids, phenolic antioxidants, organic phosphites, and/or betadiketones. A nonlimiting example of suitable betadiketones is dibenzoylmethane. A nonlimiting example of suitable dibenzoylmethane is Rhodiastab® 83. Nonlimiting examples of suitable lead-free mixed metal heat stabilizers include Mark® 6797, Mark® 6776 ACM, Mark® 6777 ACM, Therm-Chek® RC215P, Therm-Chek® 7208, Naftosafe® EH-314, Baeropan® MC 90400 KA, Baeropan® MC 90400 KA/1, Baeropan® MC8553 KA-ST 3-US, Baeropan® MC 9238 KA-US, Baeropan® MC 90249 KA, and Baeropan® MC 9754 KA. The heat stabilizer or heat stabilizers may be added to the plasticizer composition of this disclosure. Heat stabilizers can be used in amounts of 0.1 to 10 wt % based on the weight of the composition.

In an embodiment, the present polymeric composition includes a lubricant. Nonlimiting examples of suitable lubricants include stearic acid, metal salts of stearic acid, wax, and polyethylene glycols. The lubricants may be used alone or in combination.

In an embodiment, the present polymeric composition includes a processing aid. Nonlimiting examples of suitable processing aids include metal salts of carboxylic acids such as zinc stearate or calcium stearate; fatty acids such as stearic acid, oleic acid, or erucic acid; fatty amides such as stearamide, oleamide, erucamide, or N,N'-ethylene bis-stearamide; polyethylene wax; oxidized polyethylene wax; polymers of ethylene oxide; copolymers of ethylene oxide and propylene oxide; vegetable waxes; petroleum waxes; non ionic surfactants; and polysiloxanes. Processing aids can be used in amounts of 0.05 to 5 wt % based on the weight of the composition.

The polymeric compositions are generally prepared according to conventional dry blend or wet blend methods known to those skilled in the art of PVC compounding. The mixtures obtained from the blending process can be further compounded with a mixer such as a Banbury batch mixer, a Farrel Continuous Mixer, or a single or twin screw extruder.

In an embodiment, the present polymeric composition is made by absorption of the plasticizers of this disclosure in PVC powder to make a dry blend. Any suitable method/apparatus may be used to make the dry blend including, but not limited to, a Henschel mixer or a ribbon blender. The polymeric composition may contain other additives in addition to the PVC and the plasticizer. The dry blend may then be further compounded (via melt extrusion for example) and formed into any desired shape (film, pellet, etc.).

With an optimal stabilizer and antioxidant package, the present polymeric compositions are suitable for applications requiring long term dry or wet insulation resistance testing at elevated temperatures, and other demanding applications where temperatures are as high as 136° C.

The present polymeric composition(s) may comprise two or more embodiments disclosed herein.

The surprising properties of flexibility, low plasticizer volatility, low migration, low viscosity and/or high solution temperature exhibited by the present polymeric composition make it well suited for wire and cable coating applications (jackets, insulation), and high temperature wire/cable applications in particular. Accordingly, the present disclosure provides a coated metal conductor. In an embodiment, a coated metal conductor is provided and includes a metal conductor and a coating on the metal conductor. The coating is composed of the present polymeric composition which includes the polymeric resin and the present plasticizer composition. The polymeric resin of the coating may be any polymeric resin disclosed herein. The plasticizer composition may be any plasticizer composition composed of one or more SP-ACC, alone or blended with one or more EFA as disclosed herein.

A "metal conductor," as used herein, is at least one metal wire and/or at least one metal cable. The coated metal conductor may be flexible, semi-rigid, or rigid. The coating (also referred to as a "jacket" or a "sheath" or "insulation") is on the metal conductor or on another polymeric layer around the conductor. The coating includes the present composition. The composition may be any composition as disclosed herein. As used herein, "on" includes direct contact or indirect contact between the coating and the metal conductor. "Direct contact" is a configuration whereby the coating immediately contacts the metal conductor, with no intervening layer(s) and/or no intervening material(s) located between the coating and the metal conductor. "Indirect contact" is a configuration whereby an intervening layer(s) and/or an intervening structure(s) and/or intervening material(s) is/are located between the metal conductor and the coating. The coating may wholly or partially cover or otherwise surround or encase the metal conductor. The coating may be the sole component surrounding the metal conductor. Alternatively, the coating may be one layer of a multilayer jacket or sheath encasing the metal conductor.

In an embodiment, the polymeric resin is a vinyl chloride resin such as PVC as discussed above. The PVC is blended with the plasticizer composition to form the coating. The coating may include additional components. In an embodiment, the coating includes from about 1 wt % to about 99 wt % or from about 20 wt % to about 80 wt %, or from about 30 wt % to about 70 wt % PVC and from 99 wt % to about 1 wt %, or from about 80 wt % to about 20 wt %, or from about 70 wt % to about 30 wt % plasticizer composition. In a further embodiment, the coating contains from about 30 wt % to about 90 wt % PVC and from about 70 wt % to about 10 wt % of the plasticizer composition.

The plasticizer composition may be any plasticizer composition disclosed herein. In an embodiment, the SP-ACC present in the coating comprises less than 0.2 wt % insoluble components. The SP-ACC present in the coating may have a hydroxyl number from 0 to less than 15, or from 0 to less than 10, or from 0 to less than 5, or from 0 to less than 5, or 0.

The coating may have any of the properties as discussed above for the present composition. In an embodiment, the coated conductor passes the heat test as measured in accordance with UL-1581. In another embodiment, the plasticizer composition in the coating has a solution temperature from about 140° C. to about 200° C. In another embodiment, the coating has a Shore hardness from about D10 to about D70 as measured in accordance with ASTM D 2240.

Nonlimiting examples of suitable coated metal conductors include flexible wiring such as flexible wiring for consumer electronics, a power cable, a power charger wire for cell phones and/or computers, computer data cords, power cords, appliance wiring material, building wire, automotive wire, and consumer electronic accessory cords.

The present coated conductor may comprise two or more embodiments disclosed herein.

The coated conductor, such as a coated wire or a coated cable (with an optional insulation layer), with a jacket comprising the composition disclosed herein can be prepared with various types of extruders, e.g., single or twin screw types. A description of a conventional extruder can be found in U.S. Pat. No. 4,857,600. An example of co-extrusion and an extruder can be found in U.S. Pat. No. 5,575,965. A typical extruder has a hopper at its upstream end and a die at its downstream end. The hopper feeds into a barrel, which contains a screw. At the downstream end, between the end of the screw and the die, there is a screen pack and a breaker plate. The screw portion of the extruder is considered to be divided up into three sections, the feed section, the compression section, and the metering section, and two zones, the back heat zone and the front heat zone, the sections and zones running from upstream to downstream. In the alternative, there can be multiple heating zones (more than two) along the axis running from upstream to downstream. If it has more than one barrel, the barrels are connected in series. The length to diameter ratio of each barrel is in the range of about 15:1 to about 30:1.

The wire and cable constructions (i.e., a coated metal conductor) of this disclosure are made by extruding the present composition onto the conductor or onto the bundle of insulated conductors to form a coating (or a jacket) around the insulated conductors. The thickness of the jacket or insulation depends on the requirements of the desired end use application. Typical thickness of the jacket or insulation is from about 0.010 inches to about 0.200 inches, or from about 0.015 inches to about 0.050 inches. The present composition may be extruded into the jacket from previously made composition. Usually the present composition is in the form of pellets for easy feeding into the extruder. The wire and cable jacket or insulation may be extruded directly from the compounding extruder without going through the separate step of pelletizing the present composition. This one-step compounding/extrusion process would eliminate one heat history step for the composition.

In an embodiment, a nylon layer may also be extruded over the insulation, such as in conventional THHN, THWN and THWN-2 constructions.

Nonlimiting examples of embodiments of the present disclosure are provided below.

In an embodiment, a method for making a coated conductor is provided. Such method comprises purifying a plasticizer composition comprising an acetylated castor component and optionally an epoxidized fatty acid ester, and forming a plasticizer composition with less than about 0.2 wt % insoluble components. The purification may occur by way of filtration and/or centrifugation of the plasticizer composition. The method further comprises mixing the plasticizer composition with a polymeric resin to form a polymeric composition. The method includes coating a metal conductor with the polymeric composition and a forming a coated conductor.

The disclosure provides a process. The process includes purifying an acetylated castor component and forming a single phase castor component having less than 0.2 wt % insoluble component(s) after exposure to 15° C. for one week.

In an embodiment, the purification step of the process is selected from filtrating, centrifugating, sedimenting, treating with additives [such as silicon dioxide ($SiO_2$), aluminum oxide ($Al_2O_3$), activated carbon, Perlite (naturally occurring amorphous siliceous volcanic rock), diatomaceous earth], and combinations thereof.

In an embodiment, the process includes exposing, prior to the purifying, the acetylated castor component to a temperature from 5° C. to 50° C. for at least three hours, or for at least three hours to one week, or at least three hours to two weeks, or at least three hours to one month, or at least three hours to six months, or at least three hours to 12 months (or any value therein).

In an embodiment, the process includes treatment of the acetylated castor component with additives [such as silicon dioxide ($SiO_2$), aluminum oxide ($Al_2O_3$), activated carbon, Perlite (naturally occurring amorphous siliceous volcanic rock), diatomaceous earth], followed by filtration, at temperatures as high as 150° C. to result in lighter color, without necessarily decreasing the amount of insolubles.

In an embodiment, the process includes blending the single phase acetylated castor component with an epoxidized fatty acid ester and forming a plasticizer composition.

In an embodiment, the process includes blending the plasticizer composition with a polymeric resin, and forming a polymeric composition having a loop spew value from 0-2, or 0-1, or 0.

In an embodiment, the process includes coating the polymeric composition on a metal conductor and forming a coated conductor. The polymeric composition includes a polymeric resin and the plasticizer composition.

The process may comprise two or more embodiments disclosed herein.

Test Methods

Acid number (or "acid value") is a measure of the amount of free acid present in a compound. The acid number is the number of milligrams of potassium hydroxide required for the neutralization of free acid (fatty acid and/or other acid such as acetic acid, for example) present in one gram of a substance. The acid number is determined in accordance with German Standard DIN 53402 (mg KOH/g).

APHA color is measured using Color Quest XE colorimeter, available from HunterLab, or equivalent; 20-mm transmission cell; HunterLab Universal software, version 4.10 or equivalent; Black and White color reference titles available from HunterLab, or equivalent; the measured APHA color value of deionized (DI) water is zero.

Density at 25° C. is determined in accordance with German Standard DIN 51 757 ($g/cm^3$).

Dynamic storage modulus (G') and Glass transition temperature (Tg) are determined by dynamic mechanical analysis (DMA) using a TA Instrument AR1000N Rheometer having DMA fixtures. The specimen is in the form of a rectangular solid and tested in tension mode. The temperature is varied from −100° C. to +160° C. at a ramp rate of 5° C./min, and the test frequency is held constant at 6.283 rad/s (1 Hz). The storage and loss modulus of the sample, as well as the tan delta, are measured as a function of the temperature. The glass transition temperature (Tg) is determined from the peak tan delta measurement. Dynamic storage modulus (G') at −20° C. is used as a measure of low temperature flexibility. The storage and loss modulus of viscoelastic materials are measures of the stored energy (representing the elastic portion) and the energy dissipated as heat (representing the viscous portion).

Hydroxyl Number (or hydroxyl value) is an indication of the degree of acetylation and is a measure of the number of hydroxyl groups present in a polymer. The hydroxyl number is the number of milligrams of potassium hydroxide required to neutralize the hydroxyl groups in one gram of polymer. The hydroxyl number is determined in accordance with German Standard DIN 53 240 (mg KOH/g).

Iodine Number is an indication of the degree of hydrogenation and is determined in accordance with German Einheitsmethode DGF C-V 11a (53) (g $I_2$/100 g).

Loop spew is measured in accordance with ASTM D 3291 which determines the compatibility of plasticizers in poly(vinyl chloride) plastics by rating the amount of plasticizer that spews due to compressional stress set up inside a 180° loop bend. Briefly, using this method, test specimens of plasticized poly(vinyl chloride) sheet are bent through an arc of approximately 180° and secured in a jig designed to hold them in the desired conformation. The specimens are held at controlled temperature (i.e., 23° C.) and, at specified intervals of time, a specimen is removed, bent 180° in the opposite direction, and the former inside of the loop is examined for evidence of plasticizer spew by visual inspection and by wiping the area with a dry index finger. Table 3 shows the ranking of values for loop spew.

TABLE 3

| Description (Spew/Migration level) | Amount of exudate | Ranking |
|---|---|---|
| Completely dry in loop (no visible evidence in loop) (i.e., no spew or no migration) | none | 0 |
| Slippery with slight amounts of oily substances on the inside of the loop (i.e., low spew or low migration) | slight | 1 |
| Slippery with moderate amounts of oily substances on the inside of the loop (i.e., moderate spew or moderate migration) | moderate | 2 |
| Slippery with large amounts of oily substances on the inside of the loop (i.e., high spew or high migration) | heavy/ dripping | 3 |

Plasticizer compatibility in the polymeric composition is also assessed by visual inspection of molded or extruded specimens aged at elevated temperatures (e.g., 113° C. or 136° C.) for defined lengths of time (e.g., 7 days). The extruded specimens may be in the form of a wire (i.e., insulation extruded over conductor).

Shore hardness is determined in accordance with ASTM D 2240.

Solution Temperature is the temperature at which a heterogeneous mixture of plasticizer and a PVC resin is observed to change to a single phase. Solution temperature is determined by immersing 1 gram PVC in 20 grams of plasticizer and increasing the temperature stepwise until the PVC is seen to be completely dissolved by observation under a microscope, in accordance with German Standard DIN 53 408 (° C.).

Surface smoothness of coated conductors (extruded wires) is measured using a surface roughness measuring apparatus made by Mitutoyo of Japan, in accordance with ANSI/ASME B46.1.

Temperature of 5% mass loss (° C.) is determined using TG/DTA 220. The plasticizer specimen is heated from room temperature up to 600° C. at 10 K/min under inert gas purge, and the appearing mass loss and thermal effects are recorded in thermograms. The higher the temperature for 5% mass loss, the lower the volatility.

Tensile strength and tensile elongation (at 2 inch/min) on unaged specimens, on specimens aged at 113° C. or at 136° C. for 168 hours, is determined in accordance with ASTM D 638 either on dogbones cut from molded plaques or tubular insulations removed from coated conductors (extruded wires).

Turbidity is measured using a LaMotte model 2020i turbidity meter, which measures both the scattering and attenuation of light. This ISO model has a light emitting diode (LED) with wavelength of 860 nm and spectral bandwidth less than or equal to 60 nm. It uses a light detector placed at 90 degrees to the light source to measure scattered light and a detector at 180° to measure light attenuation. A third detector measures the intensity of the light source. This instrument is programmed to use light attenuation at high turbidities and light scattering at low turbidities. The measurements are made in nephelometric turbidity units (NTU), which is a measure of the cloudiness, or conversely clarity, of a liquid. Turbidity is measured by detecting and quantifying the scattering of light by a liquid or a suspension. Turbidity is measured by the attenuation of a light beam or the scattering of that light beam. Liquid to be measured for turbidity is poured into an optically transparent and non-distorting glass 10-ml vial, which is then inserted into the instrument and closed with a covering lid. The instrument first reads a blank vial, which is removed, then the vial containing the sample is inserted, and a measured value in the units chosen (NTU) is reported.

The term "UL 1581" is Underwriters Laboratories Reference Standard for Electrical Wires, Cables, and Flexible Cords. UL 1581 contains specific details for conductors, insulation, jackets and other coverings, and for methods of sample preparation, specimen selection and conditioning, and for measurement and calculation that are required in wire and cable standards.

Viscosity is determined in accordance with Standard ASTM D 445, Brookfield-Viscosimeter at 25° C. and/or 40° C.

Volume resistivity (Ohm-cm) at 23° C., with 500 volts direct current, is measured in accordance with ASTM D 257. Specimens of 3.5 inch diameter are cut from 40 mil thick molded plaques and tested using a Hewlett Packard 16008A Resistivity Cell connected to a Hewlett Packard 4329A High Resistance Meter.

Water content is determined in accordance with German Standard DIN 51 777(%).

Weight Retained (%) after 7 Days at 136° C. is measured on specimens of 1.25 inch diameter that are cut from 30 mil thick molded plaques.

By way of example, and not by limitation, examples of the present disclosure are provided.

EXAMPLES

A. Single Phase Acetylated Castor Component

Example 1

Single Phase Acetylated Castor Wax Sample (SP-ACW4)

Preparation and Separation of Insoluble Components by Filtration

Castor wax (728.5 g) and acetic anhydride (270 g) are charged in a 2 L flask. The flask is fixed with mechanical stirrer and common distillation glassware in a preheated bath of 115° C. The temperature is maintained at 115° C. over 6 hours. Vacuum from 800 to 150 mbar is used to remove residual acetic acid at a bath temperature of 115° C. A yellow, liquid product (ACW4) is obtained. The properties of ACW 4 are as follows: Density (g/cc) at 25° C.=0.951; Acid number (mg KOH/g)=1.4; Iodine value (gI2/100 g)=3; Hydroxyl Number (mg KOH/g)=3.7; Viscosity (mPa·s) @ 25° C./40° C.=330/145; Solution Temperature (° C.)=194.5; Water content (wt %)=0.013.

This liquid product (ACW4) is clear immediately after the synthesis. A 100 g sample is kept for one week at 15° C. and purified using porous filter paper [comparable to Whatman Grade 43; 16 microns]. A slimy product (0.36 wt %) is separated. The separated products are saponified, methylated and injected in a GC/MS system. The compositions are identified using the best match of the NIST 2000 library (see Table 4 below).

TABLE 4

Compositions of unfiltered liquid phase and of the separated product (deposit) after saponification and methylation

| RT min | Component | Area % of total (Deposit) | Area % of total (Liquid Phase- ACW4) |
|---|---|---|---|
| 18.47 | C16:0 (Hexadecanoic acid methyl ester, saturated) | 2.2 | 1.6 |
| 19.44 | C18:0 (Octadecanoic acid methyl ester, saturated, branched) | 0.1 | 0.1 |
| 20.24 | C18:1 (Octadecanoic acid methyl ester, unsaturated, one double bond) | 0.4 | 0.5 |
| 20.38 | C18:0 (Octadecanoic acid methyl ester, saturated) | 36.4 | 15.9 |
| 21.27 | C19:0 (Nonadecanoic acid methyl ester, saturated) | 0.1 | 0.1 |
| 21.98 | C18:0 (Octadecanoic acid 12-oxo methyl ester, saturated) | 8.2 | 4.5 |
| 22.13 | C20:0 (Eicosanoic acid methyl ester, saturated) | 1.5 | 0.6 |
| 22.65 | C18:0 (Octadecanoic acid methyl ester, saturated and functionalized —OH) | 50.8 | 76.7 |
| 23.75 | C22:0 (Docosanoic acid methyl ester, saturated) | 0.3 | — |

The results show that the separated product is a mixture of mixed acetylated triglycerides containing at least one saturated fatty acid (mainly octadecanoic acid).

The purified product (SP-ACW4) is clear, and does not become cloudy even after more than 14 months at room temperature (20° C.-26° C.), unlike the unfiltered material (ACW4). After exposure to 15° C. for one week, the SP- ACW4 is filtered over 11 μm or larger filter paper. Less than 0.2 wt % insoluble component is collected on the filter paper. Table 5 below sets forth the properties for SP-ACW4.

TABLE 5

Properties for SP-ACW4

| Properties | SP-ACW4 |
|---|---|
| Melting Point (° C.) | Liq @ RT |
| Density (g/cc) at 25° C. | 0.950-0.960 |
| Acid number (mg KOH/g) | 1-8 |
| Iodine value (gI$_2$/100 g) | <40 |
| Hydroxyl Number (mg KOH/g) | 0 to less than 15 |
| Viscosity mPa · s (@ 25C) | 100 to less than 2000 |
| Wt % Insoluble Component | <0.2 |

Example 2A

Single Phase Acetylated Castor Wax Sample (SP-ACW5(a))

Preparation of Insoluble Components by Centrifugation

The properties of ACW 5 are as follows: Density (g/cc) at 25° C.=0.954; Acid number (mg KOH/g)=2.3; Iodine value (gI2/100 g)=1.5; Hydroxyl Number (mg KOH/g)=0; Viscosity (mPa·s) @ 25° C.=348; Water content (wt %)=0.043. Acetylated castor wax (ACW5) is centrifuged at 20° C. and 5000 g-force for 8 minutes to precipitate denser insoluble components. Since the centrifuge required approximately 1 minute to reach full speed, this is considered equivalent to a full-scale disk stack centrifuge in production operating at 17,000 g-force with a practical residence time of 124 seconds. Waxy sediment is formed which amounts to 1.33% of the original volume. The starting turbidity of this feed suspension measures 235 NTU. Supernatant liquid is decanted, and its turbidity measures 192 NTU, reflecting the precipitation of more dense insoluble solids.

Centrifugation of ACW5 is repeated at 5000 g-force and 20° C. for 90 minutes. The resulting sediment constitutes 3.67% of the starting volume, and the turbidity of decanted liquid SP-ACW5(a) measures 38.3 NTU.

Example 2B

Single Phase Acetylated Castor Wax Sample (SP-ACW5(b))

Separation of Insoluble Components by Filtration

Acetylated castor wax (ACW5) is filtered at 20° C. to remove insoluble components using Pall-Seitz composite, lenticular filter medium grade K100. After 20 minutes, 35 g of filtrate containing practically no suspended solids is collected from the 47-mm diameter filter disk using a maximum differential pressure of 30 psi. The turbidity of this filtrate SP-ACW5(b) measures 1.8 NTU compared to 235 NTU for the original feed suspension. The color (APHA–20 mm) of this filtrate SP-ACW5(b) measures 256.

Example 3

Single Phase Acetylated Castor Wax Sample (SP-ACW6)

Preparation and Separation of Insoluble Components by Filtration at 15° C.

A 50 ml glass bottle is filled with ACW5 that is pre-heated to 60° C. overnight and homogenized in a quart-sized bottle. The bottle is filled from the 5-gallon pail of Example 2 and is stored unfiltered on the laboratory bench-top. The 50-ml bottle is kept in a 15° C. water bath for 7 days. Noticeable haze is found to appear after about 1 hour at this temperature. After 7 days, the liquid is filtered under nitrogen pressure with a 1.2 μm Whatman GF/C glass microfiber filter to produce SP-ACW6. The amount of insolubles collected is measured to be about 1.82 wt %. The purified ACW6 (SP-ACW6) is exposed to 15° C. for one week, then filtered over 11 μm (or larger) filter paper which collects less than 0.2 wt % insoluble component.

Examples 4 to 6

Single Phase Acetylated Castor Wax Samples (SP-ACW7, SP-ACW8, SP-ACW9)

Preparation and Removal of Color by Contact with Additives and Filtration

Acetylated castor wax (ACW5) is heated to 50° C. A different additive is added to a respective separate sample of ACW5: 5 wt % of SiO$_2$ (ACW7), 5 wt % Al$_2$O$_3$ (ACW8), and 5 wt % activated carbon (ACW9). Each mixture is stirred overnight and subsequently filtered using Whatman Qualitative Filter Paper Grade 1 (11 μm). The color (APHA–20 mm) is measured using Color Quest XE from Hunter Lab. The APHA value for deionized water is 0. The experimental results are summarized Table 6. All three additives are effective at removing color from ACW5, resulting in substantially lighter color, with SiO$_2$ performing the best.

TABLE 6

Treatment of acetylated castor wax with additives to decrease color

| | ACW5 | Ex. 4 (SP-ACW7) | Ex. 5 (SP-ACW8) | Ex. 6 (SP-ACW9) |
|---|---|---|---|---|
| Treatment | Un-treated | SiO$_2$ | Al$_2$O$_3$ (activated, neutral) | Activated Carbon |
| Color (APHA-20 mm | 398 | 215 | 322 | 279 |

B. Thermoplastic Compositions: Blends of PVC & Plasticizer Composition

Thermoplastic compositions composed of blends of polyvinylchloride (PVC) with various plasticizer compositions and additives are prepared as shown in Table 7 below.

TABLE 7

Thermoplastic Compositions

| | Blend 7 (w/ ACW4 plasticizer) | Blend 8 (w/ SP-ACW4 plasticizer) |
|---|---|---|
| PVC | 62.3 | 62.3 |
| ACW Plasticizer | 15.0 | 15.0 |
| Clay | 6.4 | 6.4 |
| ESO Plasticizer | 15.0 | 15.0 |

TABLE 7-continued

Thermoplastic Compositions

|  | Blend 7 (w/ ACW4 plasticizer) | Blend 8 (w/ SP-ACW4 plasticizer) |
|---|---|---|
| Baeropan ® MC 90249 KA | 1.0 | 1.0 |
| Irganox ® 1076 | 0.3 | 0.3 |

Baeropan ® MC 90249 KA = heat stabilizer (Baerlocher)
Clay = Satintone ® SP-33 clay filler (New England Resins & Pigments Corp.)
ESO = PLAS-CHEK ® 775 epoxidized soybean oil (Ferro)
Irganox ® 1076 = hindered phenolic antioxidant (Ciba Chemicals)
PVC = polyvinyl chloride homopolymer (OxyVinyls ® 240F)
Values = wt % based on total weight of composition
*Wt % based on weight of total plasticizer

C. Thermoplastic Compositions 7 and 8 (Blends 7 and 8)

The following procedure is used to prepare the Blends 7 and 8:

Preheat the ACW and ESO plasticizers to 60° C. for at least 60 minutes, shake before use and mix together to make the plasticizer composition
Weigh the individual ingredients
First make 'dry blends' by soaking the plasticizer composition into PVC powder, and then make melt mixtures
The following procedure is used for preparation of 'dry blends':
  (a) Make "solids mixture" by mixing everything (except plasticizer composition and filler) in a container using spatula.
  (b) Use "40 cm$^3$" Brabender mixing bowl with sigma blades at 90° C. and 40 rpm.
  (c) After 2 minute warm-up, add the solids mixture. Mix for 30 seconds.
  (d) Add plasticizer composition. Mix for 360 seconds (6 minutes).
  (e) Add clay filler. Mix for 60 seconds.
  (f) Stop and remove "dry blend".

The 'dry blends' are subsequently melt mixed using the following procedure:

(a) Use "40 cm$^3$" Brabender mixing bowl with cam rotors at 40 rpm setting.

(b) Add 'dry blend', and mix at 180° C. for 2 minutes.

The blend compositions from the mixing bowl are compression molded at 180° C. for 5 minutes. Specimens are cut from 30 mil thick molded plaques for testing of all properties except volume resistivity. The hardness, weight, tensile strength/elongation (at 2 inch/min) are measured on unaged specimens and specimens aged at 113° C. or 136° C. for 168 hours, that have been cut from the 30 mil thick plaques. The heat aged molded specimens are also examined visually for evidence of exudate (spew) at the surface. Loop spew is measured on specimens aged at room temperature for 48 hours. Volume resistivity is measured on specimens cut from 40 mil thick molded plaques. The results are given in Table 8.

Table 8 provides properties for the various thermoplastic compositions.

TABLE 8

| Blend # | Plasticizer Composition | Color of Melt Blend | Shore (D) | TS | TSR 113° C. | TSR 136° C. | TE | TER 113° C. | TER 136° C. | Wt Ret. | Spew 113° C. | Spew 136° C. | Spew RT | Vol Res |
|---|---|---|---|---|---|---|---|---|---|---|---|---|---|---|
| 7 | ACW4 (50) ESO (50) | Cream | 38.5 ± 0.4 | 3676 ± 112 | 99 ± 7 | 94 ± 4 | 291 ± 0 | 96 ± 10 | 86 ± 2 | 99.7 | None | None | 3 | 4.37E+15 |
| 8 | SP-ACW4 (50) ESO (50) | Cream | 36.4 ± 0.6 | 3644 ± 113 | 100 ± 6 | 101 ± 3 | 298 ± 19 | 95 ± 11 | 86 ± 5 | 99.7 | None | None | 2 | 4.05E+15 |

Shore (D) = Shore D hardness ASTM D 2240
RT = Room temperature
Spew 113° C. = Exudate (spew) on surface after 7 days at 113° C.
Spew 136° C. = Exudate (spew) on surface after 7 days at 136° C.
Spew RT = Loop Spew on surface after 48 hours at room temperature (RT)
TE = Tensile elongation (%), unaged specimen, ASTM D 638
TER = Tensile elongation retention (%), ASTM D 638
TER 113° C. = Tensile elongation retention (%), specimen aged at 113° C. for 168 hours
TER 136° C. = Tensile elongation retention (%), specimen aged at 136° C. for 168 hours
TS = Tensile strength (psi), unaged specimen, ASTM D 638
TSR = Tensile strength retention (%), ASTM D 638
TSR 113° C. = Tensile strength retention (%), specimen aged at 113° C. for 168 hours
TSR 136° C. = Tensile strength retention (%), specimen aged at 136° C. for 168 hours
Vol Res = Volume Resistivity (Ohm cm) @ 23° C.
Wt Ret. = Retained weight (%) after 7 days @ 136° C.

Blends 7 and 8 both exhibit satisfactory properties before and after heat aging. However, the purified ACW4 or SP-ACW4 (blend 8) results in lower hardness (i.e., increased plasticization efficiency) and less loop-spew than the unpurified ACW4 (blend 7).

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A single phase acetylated castor component having less than about 0.2 wt % insoluble components after exposure to 15° C. for at least one week, wherein the component has an iodine number of less than 40 g I$_2$/100 g.

2. The component of claim 1 wherein the single phase acetylated castor component is selected from the group consisting of a single phase acetylated castor oil, a single phase acetylated castor wax, and combinations thereof.

3. The component of claim 1 having a hydroxyl number from 0 to less than 5 as measured in accordance with DIN 53402.

4. The component of claim 1 having a viscosity less than 2000 mPa·s as measured in accordance with ASTM D 445 at 25° C.

5. The component of claim 1 having a turbidity from 1.0 NTU to 50 NTU.

6. The component of claim 1 having color less than 500 APHA.

7. A composition comprising:
the single phase acetylated castor component of claim 1;
an epoxidized fatty acid ester; and
the composition has less than 0.2 wt % insoluble components after exposure to 15° C. for at least one week.

8. The composition of claim 7 wherein the epoxidized fatty acid ester is selected from the group consisting of epoxidized soybean oil, epoxidized propylene glycol dioleate, epoxidized palm oil, epoxidized linseed oil, epoxidized fatty acid methyl esters, epoxidized derivatives of each of the foregoing, and combinations thereof.

9. A polymeric composition comprising:
a polymeric resin;
a plasticizer composition comprising the single phase acetylated castor component of claim 1 and optionally an epoxidized fatty acid ester; and
the polymeric composition has a loop spew value from 0-2 as measured in accordance with ASTM D 3291.

10. The polymeric composition of claim 9 wherein the plasticizer composition comprises less than 0.2 wt % insoluble components after exposure to 15° C. for at least one week.

11. The polymeric composition of claim 9 wherein the plasticizer composition comprises an epoxidized fatty acid ester selected from the group consisting of epoxidized soybean oil, epoxidized propylene glycol dioleate, epoxidized palm oil, epoxidized linseed oil, epoxidized fatty acid methyl esters, epoxidized derivatives of each of the foregoing, and combinations thereof.

12. A coated conductor comprising:
a metal conductor; and
a coating on the metal conductor, the coating comprising a polymeric resin and a plasticizer composition comprising the single phase acetylated castor component of claim 1 and optionally an epoxidized fatty acid ester.

13. The coated conductor of claim 12 wherein the plasticizer composition comprises less than 0.2 wt % insoluble components after exposure to 15° C. for at least one week.

14. The coated conductor of claim 12 wherein the plasticizer composition comprises an epoxidized fatty acid ester selected from the group consisting of epoxidized soybean oil, epoxidized propylene glycol dioleate, epoxidized palm oil, epoxidized linseed oil, epoxidized fatty acid methyl esters, epoxidized derivatives of each of the foregoing, and combinations thereof.

15. The component of claim 1 having an iodine number of less than or equal to 3 g I$_2$/100 g.

* * * * *